(12) United States Patent
Hunt et al.

(10) Patent No.: US 11,210,753 B2
(45) Date of Patent: Dec. 28, 2021

(54) SYSTEM AND METHOD FOR PERFORMING COMMUNITY COMPLIANCE

(71) Applicants: Wesley Hunt, Winter Garden, FL (US); Kraig Carmickle, Winter Garden, FL (US)

(72) Inventors: Wesley Hunt, Winter Garden, FL (US); Kraig Carmickle, Winter Garden, FL (US)

( * ) Notice: Subject to any disclaimer, the term of this patent is extended or adjusted under 35 U.S.C. 154(b) by 0 days.

(21) Appl. No.: 16/907,032

(22) Filed: Jun. 19, 2020

(65) Prior Publication Data

US 2020/0402188 A1 Dec. 24, 2020

Related U.S. Application Data

(60) Provisional application No. 62/865,169, filed on Jun. 22, 2019.

(51) Int. Cl.
*G06Q 50/16* (2012.01)
*H04N 7/18* (2006.01)
*H04N 5/225* (2006.01)

(52) U.S. Cl.
CPC ......... *G06Q 50/163* (2013.01); *H04N 5/2253* (2013.01); *H04N 7/185* (2013.01)

(58) Field of Classification Search
CPC .... G06Q 50/163; H04N 7/185; H04N 5/2253; H04N 5/2257
See application file for complete search history.

(56) References Cited

U.S. PATENT DOCUMENTS

| | | | | |
|---|---|---|---|---|
| 2007/0027704 | A1* | 2/2007 | Patel | G06Q 50/163 705/314 |
| 2008/0154774 | A1* | 6/2008 | Dennison | H04L 9/088 705/51 |
| 2014/0142849 | A1* | 5/2014 | Ziezold | G01C 21/3644 701/533 |
| 2017/0330460 | A1* | 11/2017 | Massey | G08G 1/0175 |

* cited by examiner

*Primary Examiner* — Jared Walker
(74) *Attorney, Agent, or Firm* — Jason T. Daniel, Esq.; Daniel Law Offices, P.A.

(57) ABSTRACT

A system for performing community compliance includes a system administration for generating and supporting a website and mobile application for facilitating communication between a property management interface device, a driver interface device and a community interface device. A data capture platform having a vehicle mounted camera and a location module are communicatively linked to the driver interface device.

A method for performing community compliance includes capturing audiovisual information and address information from a vehicle driving through a community; performing a virtual drive through of the community using the captured community data; identifying violations of the community rules, and generating a violation report to be sent to the subject property. The method also includes generating a community report listing all violation notices sent and a log outlining the time and date the data platform visited the community.

16 Claims, 14 Drawing Sheets

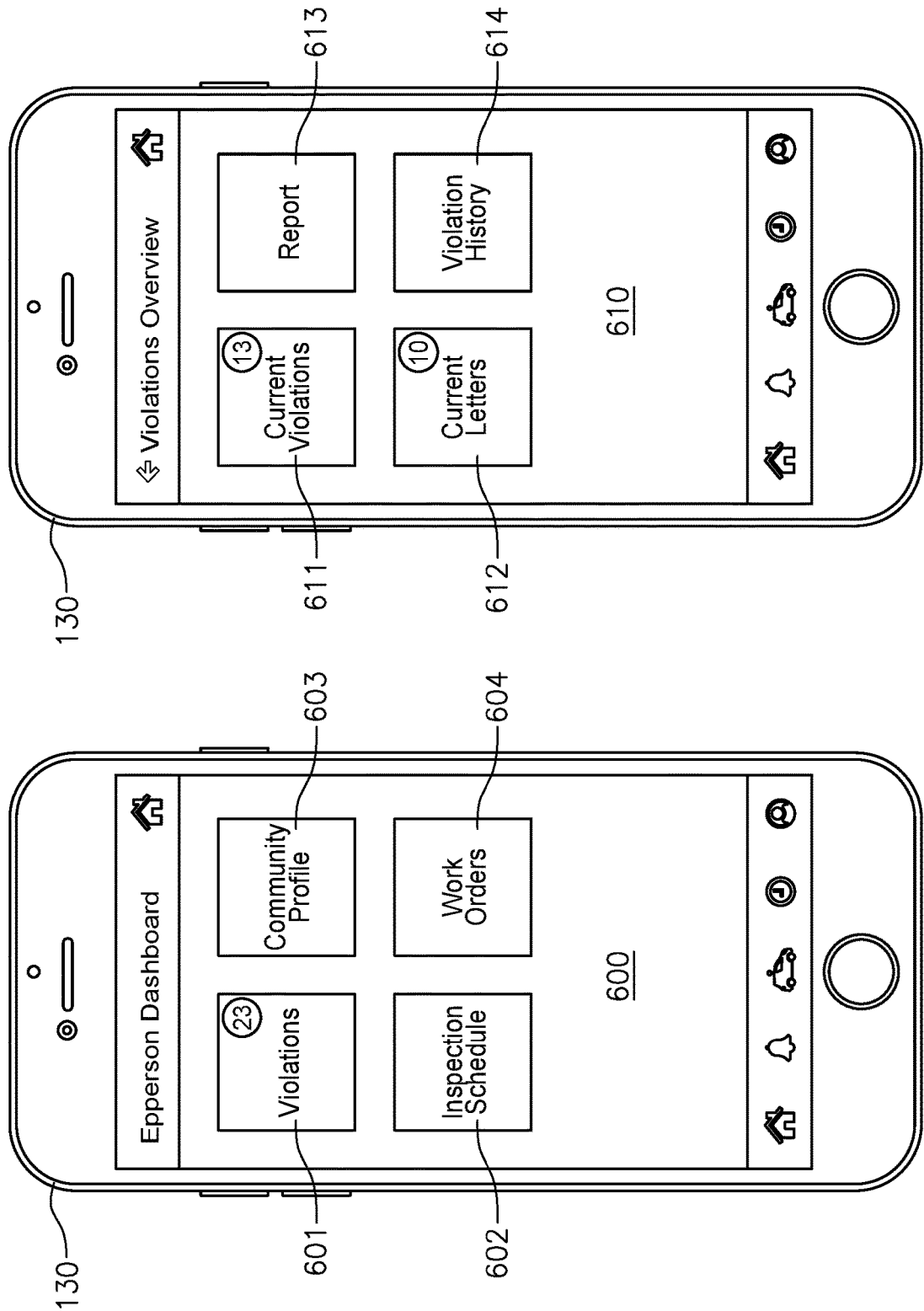

SYSTEM AND METHOD FOR PERFORMING COMMUNITY COMPLIANCE

CROSS-REFERENCE TO RELATED APPLICATIONS

This application claims the benefit of U.S. Application Ser. No. 62/865,169 filed on Jun. 22, 2019, the contents of which are incorporated herein by reference.

TECHNICAL FIELD

The present invention relates generally to innovations in compliance reporting, and more particularly to a system and method for capturing and reporting community compliance violations.

BACKGROUND

The statements in this section merely provide background information related to the present disclosure and may not constitute prior art.

Many neighborhoods have some type of a homeowner's association structure which functions to maintain and enhance the value of the neighborhood community through adherence to particular covenants, conditions and restrictions (CC&R). The CC&R's provide a set of requirements and limitations pertaining to what property owners may and may not do with, to, and/or on their property.

Depending on the size of the community, and in accordance with the established bylaws of the same, many communities hire third-party management companies to conduct periodic inspections. These inspections are typically performed by a single individual who will drive through the neighborhood looking for violations of the CC&R and other such community rules.

Upon finding a violation, the individual will typically park the vehicle in front of the subject's property so as to make notes and take photographs of the violation. Upon gathering all violations for a community, the management inspector will return to their office to generate violation notices for the property owner(s) and provide reporting and compliance reports to the Board of Directors.

Although this process is the norm in the industry, the process of manually uploading photographs and inspector notes into existing compliance software is burdensome and time consuming. Moreover, there are several safety concerns associated with the current processes.

For example, it is not uncommon for an angry property owner to verbally or physically confront the inspector who must remain parked outside of the residence while recording a violation. Additionally, because the inspector is spending their time looking for violations as they drive through a community, many accidents occur because the inspector's attention is not focused on the road. Sadly, more than one death has resulted from such distracted driving.

Accordingly, it would be beneficial to provide a community compliance system and method of using the same which can assist property managers in performing their duties without suffering from the drawbacks described above, along with streamlining compliance and reporting efforts.

SUMMARY OF THE INVENTION

The present invention is directed to a system and method for performing community compliance. One embodiment of the present invention can include a system administration for generating and supporting a website and mobile application for facilitating communication between a property management interface device, a driver interface device and a community interface device.

A data capture platform having a vehicle mounted camera and a location module can be communicatively linked to the driver interface device. The platform can function to capture real time audiovisual information and address information as the vehicle drives through a community. Upon completion of the drive, the community data can be transferred to the system administrator.

The property management interface device can perform a virtual drive through of the community using the captured community data. During the drive through, the representative can manipulate the captured images to identify violations of the community rules. Upon determining a violation to the rules, the user can generate a violation report to be sent to the subject property. In one embodiment, the violation report can include an augmented image highlighting the violation.

The community interface device can receive a community report generated by the property management interface device. The report can include a listing of all violation notices sent and a log outlining the time and date the data platform was driven through the community.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

FIGS. 4A-6C each show exemplary interface presentation screens of the system, in accordance with one embodiment.

DETAILED DESCRIPTION OF THE INVENTION

Figure 1:
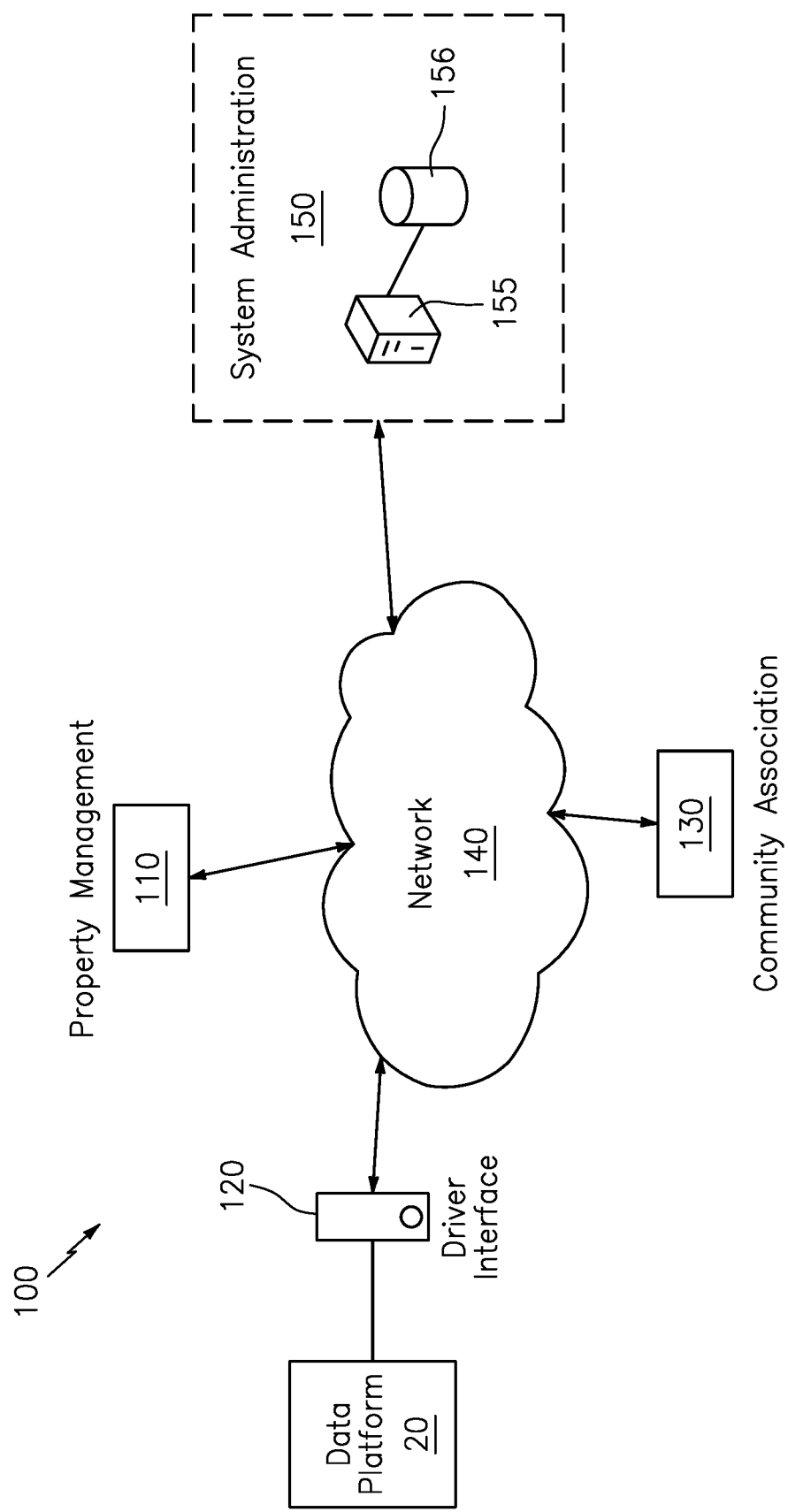
FIG. 1 shows an exemplary network environment of a system for performing community compliance according to some embodiments of the technology.

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Identical reference numerals are used for like elements of the invention or elements of like function. For the sake of clarity, only those reference numerals are shown in the individual figures which are necessary for the description of the respective figure.

Although described for use by a management company for detecting and enforcing homeowner violations and the like, this is for illustrative purposes only. To this end, the inventive concepts may be readily adapted for use in any number of other industries without undue experimentation.

Definitions

As described herein, the term "system administrator" can be used to describe any individual, group or legal entity that is performing the below described system administration 150, in furtherance of the methodology described herein. In one embodiment, the system administrator can be an independent third-party company providing services to a property management company for use with their clients. In another embodiment, the system administrator and the property management company can be the same entity.

As described herein, a "community association" can be the legal entity (and its representatives) for a particular community/neighborhood that is authorized to establish, maintain and/or enforce a set of community rules (e.g., covenants, conditions and restrictions) for the particular community.

As described herein, "property management company" can be any individual, group or legal entity that uses the below described system to determine, report and/or enforce violations of the community rules on behalf of the community association.

As described herein, "community data" shall include any and all data, photographs, video, audio, location information and the like that is captured by the below described data capture platform about a community.

As described herein, the term "community reports" can include any information that is generated by the property management company based on the community data. Several nonlimiting examples of community reports include, but are not limited to: community rules violation notices, community rules enforcement documents, property condition reports, maintenance completion reports, visitation logs (e.g., verified visit reports showing when a community was visited by a property management employee), and/or raw data feeds from the data capture platform 20, for example.

FIG. 1 is a schematic illustration of an exemplary operating environment 100 for implementing a system for performing community compliance. In one embodiment, the system 100 can include at least one property management user interface device 110, at least one data capture platform 20 having a driver interface device 120, and at least one community association interface device 130, that can be connected over a network 140 with a system administration 150.

The network 140 can be any type of network, including a cellular network, local area network ("LAN"), such as an intranet, a wide area network ("WAN"), the internet, and/or any other type of data transmission and reception medium.

Each of the interface devices 110, 120 and 130 can be any type of computing device that is operable by a human user. A computing device refers to any device with a processor and memory that can execute instructions and communicate with another device. Computing devices include, but are not limited to, smartphones, tablet computers, personal computers, laptop computers and/or purpose-built machines that are pre-encoded with an application interface, so as to perform the functionality so described. In either instance, each of the computing devices can include one or more client applications, such as a conventional web browser, and/or an application interface, for example, which can allow the device to communicate with other interface devices and/or the system administration 150.

The system administration 150, according to one embodiment, can include one or more individual computing devices 155 that can be connected to one or more databases 156 on which various portions of the below described methodology can be performed. The system administration 150 can function to provide a central hub for controlling the communication between the interface devices 110, 120 and 130 through any number of different mediums such as a website, mobile application, secure application or email, for example. In this regard, one or more of the individual computing devices 155 can include various web servers, email servers, application database servers and so forth.

The database 156 can function to store any type of data, including the system operating instructions for facilitating communication between the device components, routing information and/or generating presentation screens for implementing the below described methodology. To this end, the database can include any type of computer-readable storage mediums, including all forms of volatile and non-volatile memory such as, for example, semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD.

As will be described below, the driver interface device 120 can be used by the operator of the data platform 20 to capture community data. The property management user interface device 110 can be operated by a property management company representative to view the community data captured by the data capture platform and/or to generate community reports pertaining to the same. The community association user interface device 130 can be operated by any designated member of a community association, such as the board of directors, for example, and can function to receive the community reports generated by the property management company.

Figure 2A:
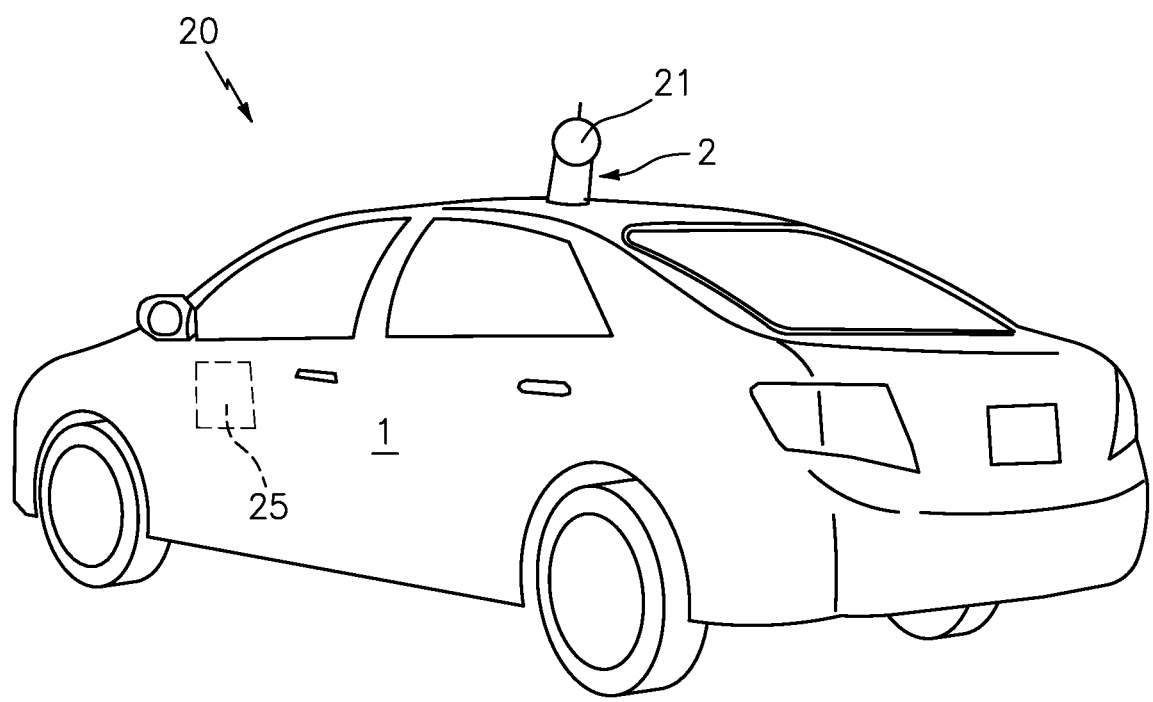
FIG. 2A shows an exemplary view of the data capture platform of the system in operation, in accordance with one embodiment.
Figure 2B:
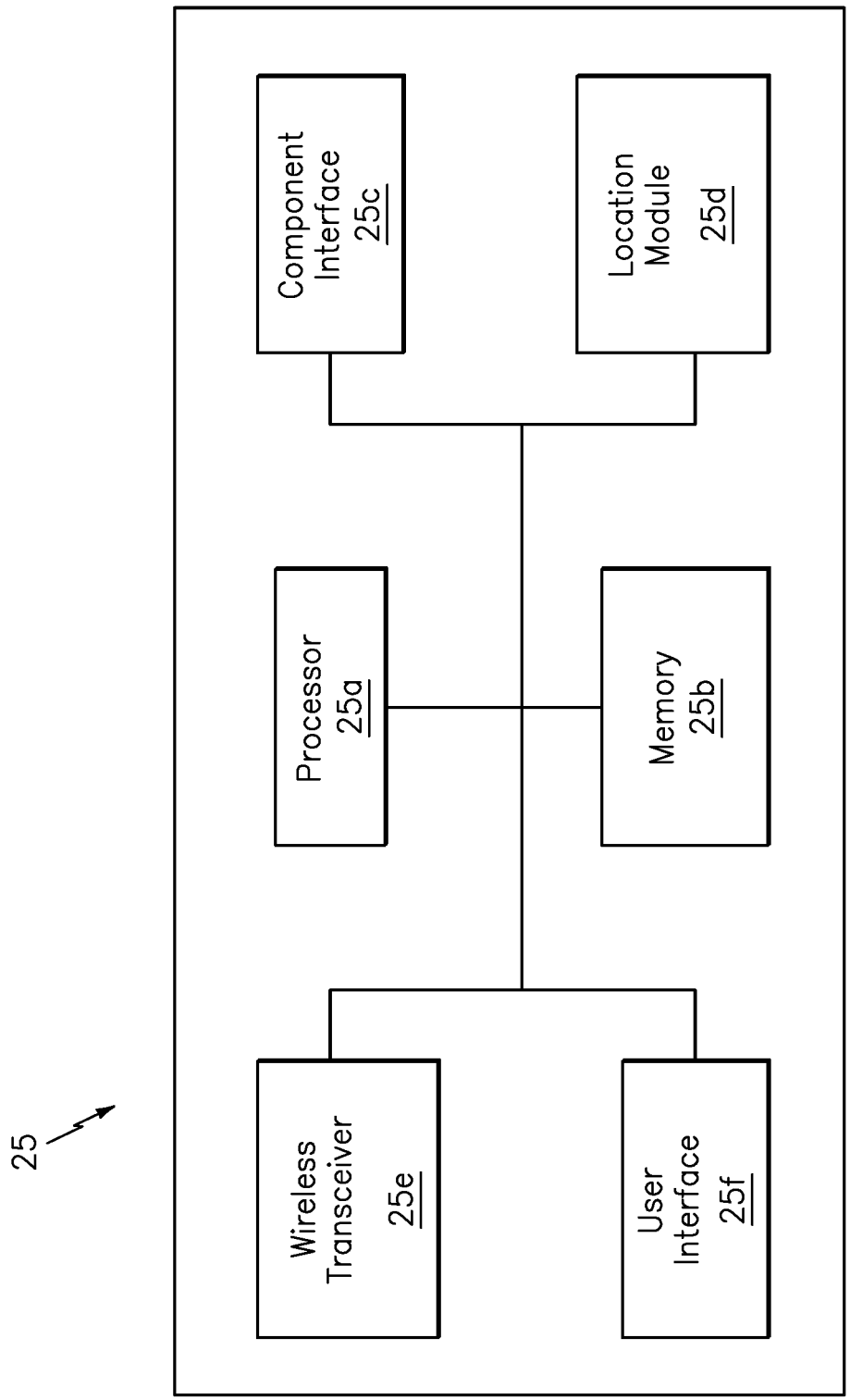
FIG. 2B shows an exemplary block diagram of the controller of the data capture platform, in accordance with one embodiment.

FIGS. 2A and 2B illustrate one embodiment of a data capture platform 20 for use with the system 100. As shown, the platform 20 can include, essentially, a camera 21 that is communicatively linked to a controller 25 and/or the driver interface device 120.

In the preferred embodiment, the camera 21 can include functionality for capturing images in 360 degrees and can be selectively mounted onto the roof of a vehicle 1 via a camera mount 2. One suitable example of a 360-degree camera for use herein includes the 5.8K 360 Degree video camera commercially available from Rylo, Inc.

Of course, the camera 21 is not limited to the above noted camera, as any type of sound and/or image capture device capable of recording still or moving images in any one of the visible, near-infrared, or any appropriate spectrum are also contemplated. To this end, the camera may be positioned anywhere along or within the vehicle 1 and may further include or incorporate any number of known focusing lenses.

In one embodiment, the camera 21 and/or camera mount 2 may also include functionality for allowing an operator to move, pan, tilt or otherwise adjust the orientation of the camera. In either instance, images and sound captured by the camera 21 can be stored within an onboard memory of the camera itself, and/or can be delivered to the controller 25 via a wired or wireless transmission.

In one embodiment, the driver interface device 120 can comprise a smartphone, and the controller 25 can comprise a mobile application for execution on the smartphone. The mobile application functioning to send and receive information with the camera 21 via a proximal wireless connection such as Bluetooth or WiFi, for example. Data captured by the camera can then be transmitted to the system administrator and/or property management over the network 140. Moreover, the App can function to receive information from the network 140 such as route information, driving instructions and the like, among other information, for example.

In one embodiment, the controller 25 and driver interface device 120 can comprise a purpose-built device for positioning within the vehicle 1. In such an embodiment, the controller 25 can include a processor 25*a* that is conventionally connected to an internal memory 25*b*, a component interface 25*c*, a location identification device 25*d*, a wireless transceiver 25*e*, and a user interface 25*f*.

Although illustrated as separate elements, those of skill in the art will recognize that one or more system components may comprise or include one or more printed circuit boards (PCB) containing any number of integrated circuit or circuits for completing the activities described herein. Of course, any number of other analog and/or digital components capable of performing the below described functionality can be provided in place of, or in conjunction with the below described controller elements.

The processor 25*a* can be a conventional central processing unit (CPU) or any other type of device, or multiple devices, capable of manipulating or processing information such as program code stored in the memory 25*b* and for causing the circuitry to complete the activities and functionality described herein.

Memory 25*b* can act to store operating instructions in the form of program code for the processor 25*a* to execute, along with data captured by the camera 21. Although illustrated in FIG. 2B as a single component, memory 25*b* can include one or more physical memory devices such as, for example, local memory and/or one or more bulk storage devices. As used herein, local memory can refer to random access memory or other non-persistent memory device(s) generally used during actual execution of program code, whereas a bulk storage device can be implemented as a persistent data storage device such as a hard drive, for example, containing programs that permit the processor to perform the functionality described below. Additionally, memory 25*b* can also include one or more cache memories that provide temporary storage of at least some program code in order to reduce the number of times program code must be retrieved from the bulk storage device during execution. Each of these devices are well known in the art.

The component interface 25*c* can function to provide a communicative link between the processor 25*a* and the camera 21. In this regard, the component interface unit can include any number of different components such as communication cables for connecting the camera and controller, and/or wireless transceivers such as Bluetooth or WIFI, for example, capable of performing wireless communication with the camera. Of course, any other means for providing the two-way communication between the identified components can also be utilized herein.

The location identification device 25*d* can function to provide real time location information (e.g., GPS coordinates, address, etc.) of the vehicle 1 at all times. In the preferred embodiment, the location module can comprise a cellular location device or a GPS location device, for example. In either instance, the captured location information can be recorded concurrently with the camera data to identify the location/address corresponding to images captured by the camera.

The communication unit 25*e* can include any number of components capable of sending and/or receiving electronic signals with an externally located device, either directly or over a network. In one preferred embodiment, the communication unit can include a cellular transceiver for communicating with one or both of the system administration 150 or the property management interface device 110 via the network 140.

The user interface 25*f* can function to accept user inputs for controlling the operation of the camera and can provide data from the camera for viewing by the user. The user interface can also include functionality for allowing the driver to send and receive information across the network 140. Such information including, for example, driving directions, as route driving instructions and the like, among other information, for example. In the preferred embodiment, the user interface can comprise a touchscreen display capable of displaying images from the camera and receiving inputs from the user via a menu of options.

A method for performing community compliance using the system 100 will now be described with respect to FIG. 3 Although described below with respect to particular steps, this is for illustrative purposes only, as the methodology described herein can be performed in a different order than shown and/or can include any number of other steps.

Figure 3:
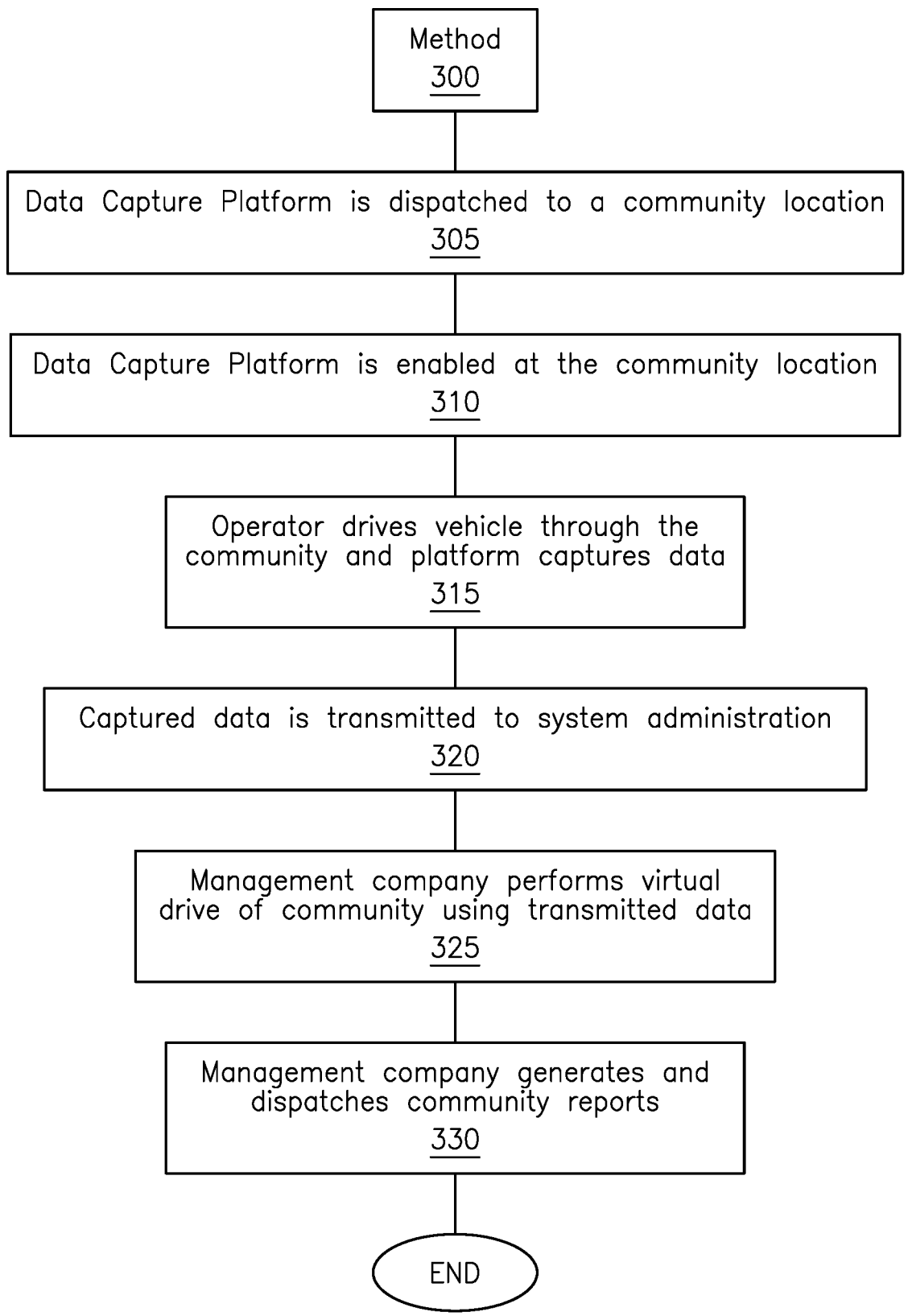
FIG. 3 shows an exemplary flow diagram illustrating a method for performing community compliance, according to one embodiment.

As shown at FIG. 3, the method can begin at step 305 wherein the data capture platform is dispatched to a contracted community. Next, the method can proceed to step 310, wherein the platform operator can setup the camera 21 and can enable the platform 20 to begin capturing data.

Next, the method can proceed to step 315 where the operator can drive the vehicle 1 throughout the entire community. At this time, the platform 20 can capture complete, high resolution images of every property and structure within the community for later analysis. In this regard, each of these images can be linked to a physical address via the location module 25*d*, so as to be clearly identifiable.

At step 320, the controller can transmit the community data to the system administration 150 via the network 140. This data transmission can occur in real time as the images are captured, or can be sent in periodic updates, and/or can be sent as a complete file upon the conclusion of step 315.

At step 325, the property management company can utilize the interface device 101 to access the community data from the system administration. As will be described below, this arrangement allows the management company employee to perform a virtual drive through the computer so as to identify violations without being physically located at the community, thus eliminating chance encounters with angry property owners. Moreover, and importantly, because the vehicle driver is not conducting an inspection concurrently with the property visit, his or her attention is focused solely on operating the vehicle safely.

Finally, at step 330, the property management company can create and submit community reports based on the provided community data.

FIGS. 4A-6C illustrate several exemplary presentation screens 400-620 illustrating use of the system throughout the above described method steps. In one embodiment, the below illustrated presentation screens can be generated by the system administration 150 for use with interface devices 110, 120 and 130, for example. Although illustrated in the form of a website or mobile application, this is for illustrative purposes only, as the inventive concepts disclosed herein can be implemented across a wide variety of different platforms as described above, without deviating from the scope and spirit of the inventive concepts disclosed herein.

FIGS. 4A-4D illustrate exemplary presentation screens 400, 410, 415 and 420 that can be displayed on the driver interface 120 for use with the above noted data capture platform 20. After logging in to the system, the user can view a drive orders presentation screen 400 shown at FIG. 4A. Page 400 can function as the home screen for the driver in order to provide them with a list of communities to be visited. The list can be categorized into any number of groups, such as new 401, pending upload 402 and completed 403, for example.

Figure 4B:
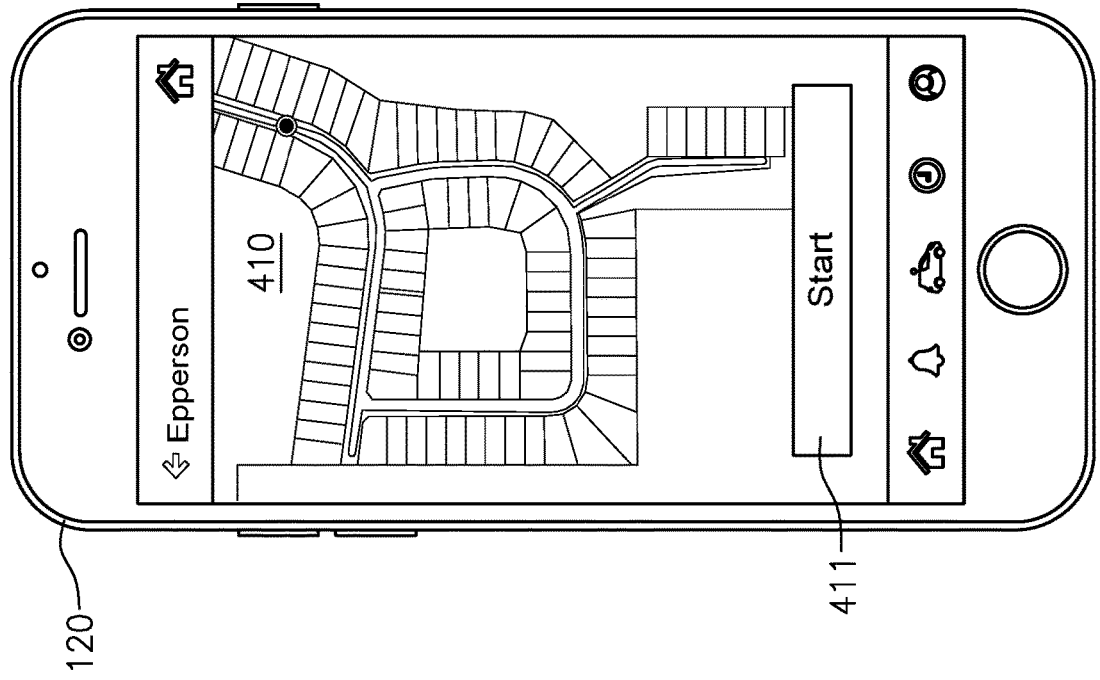
Figure 4A:
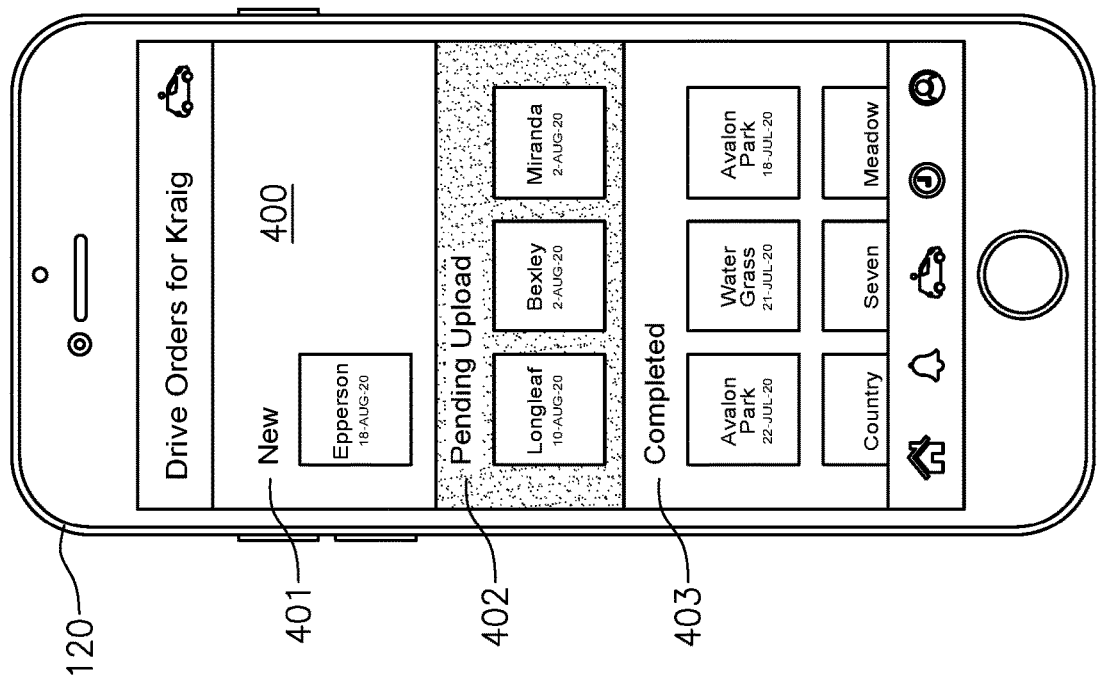
Figure 4D:
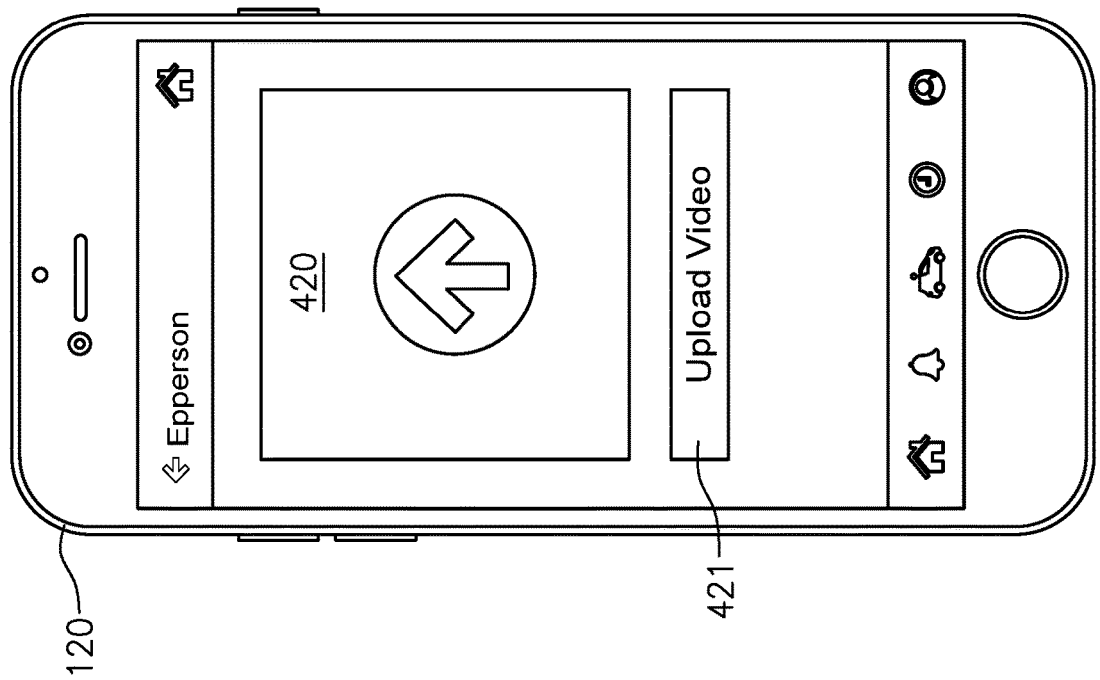
Figure 4C:
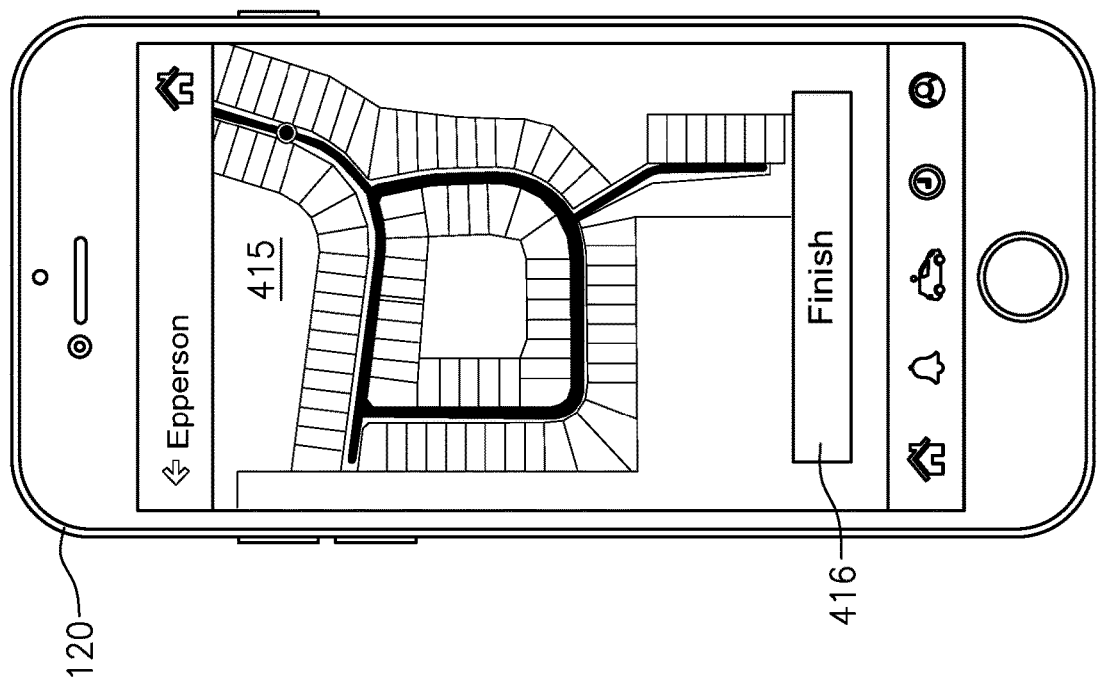

As shown at FIGS. 4B and 4C, upon selecting a community from the list at 400, driving directions can be displayed to the driver at page 410. Once the driver reaches the community and activates the data capture platform 20, the driver can select the START button 411. Next, the system can display presentation screen 415 which can log the progress of the driver throughout the selected community, thus ensuring the driver covers all streets. Upon completion of the driving task, the driver can select finish 416 wherein the drive log, including time stamped location information can be packaged with the data captured by the camera system 21.

As shown at FIG. 4D, this information can then be provided as an upload option 420 to the driver wherein selecting the UPLOAD button 421 the data can be transmitted to the system administrator. Of course, other embodiments are contemplated wherein the upload process is automatically performed upon the conclusion of the drive or is updated continually throughout the drive. At the conclusion of this step, the device 120 can return to the home screen 401.

FIGS. 5A-5F illustrate exemplary presentation screens 500, 510, 520, 530, 540 and 550 that can be displayed on the property management interface 110. After logging in to the system, the user can view a home presentation screen 500 shown at FIG. 5A. Page 500 can function as the home screen for the user and can provide them with a list of selectable menu options 501 for accessing different functionality of the system, and a selectable listing of communities 502. Additionally, the user can be provided with options for uploading and onboarding new communities, along with dispatching instructions to the driver(s) of the mobile data platform 20.

Figure 5A:
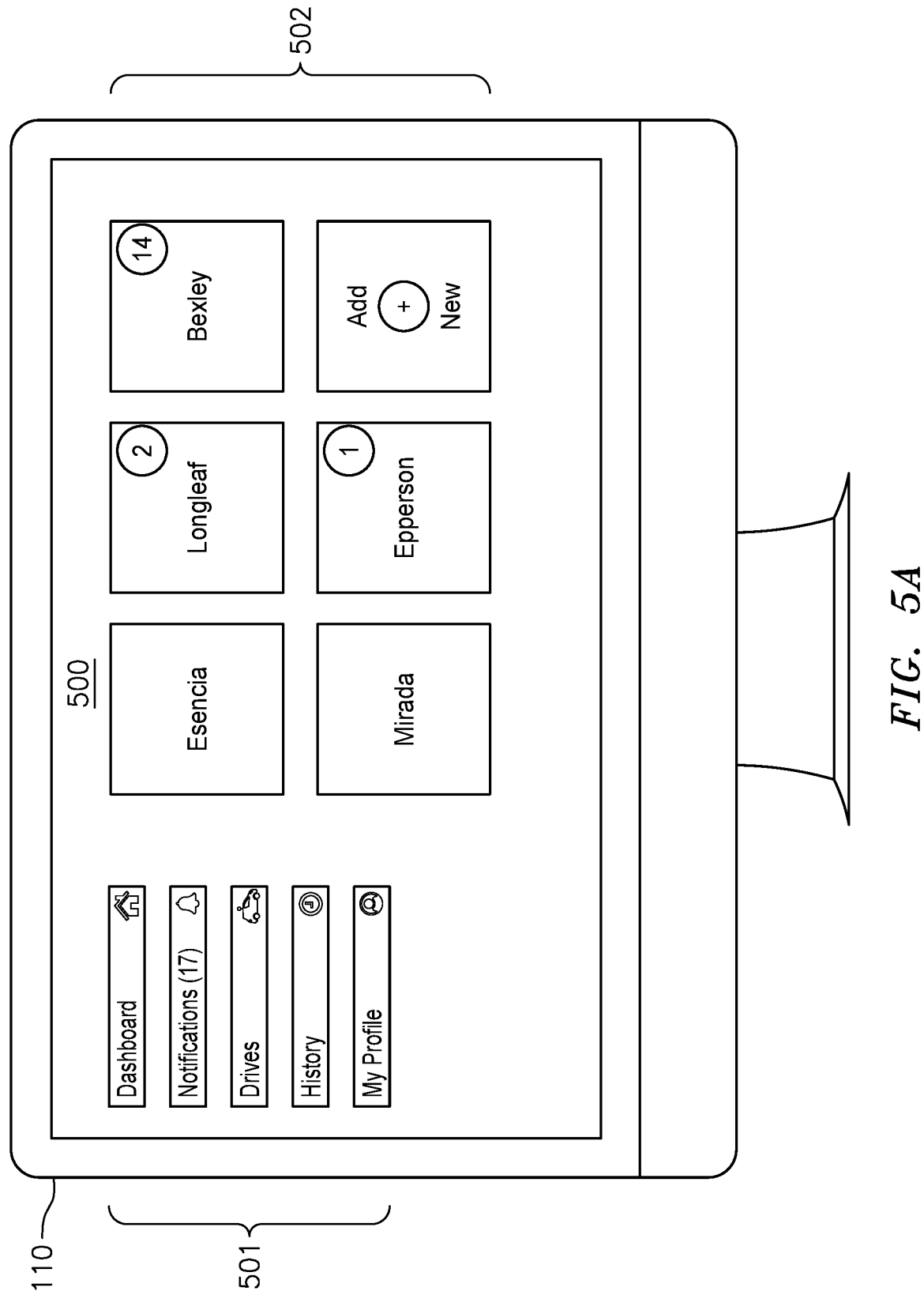
Figure 5B:
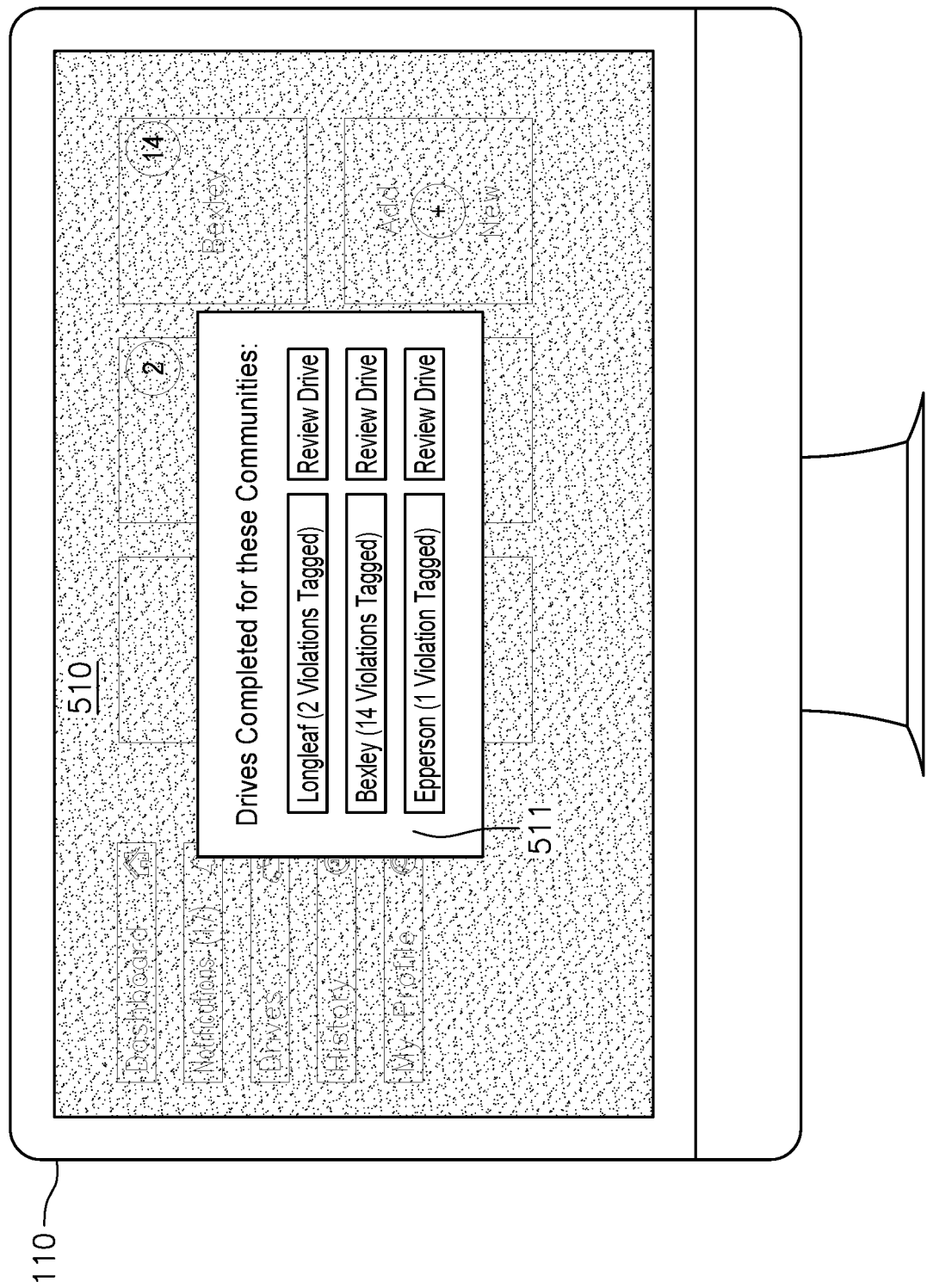

As shown at presentation screen 510 of FIG. 5B, the system can display a selectable sub-listing of communities 511 that have been visited by the mobile data platform 20 and have community data uploaded by the driver.

Figure 5C:
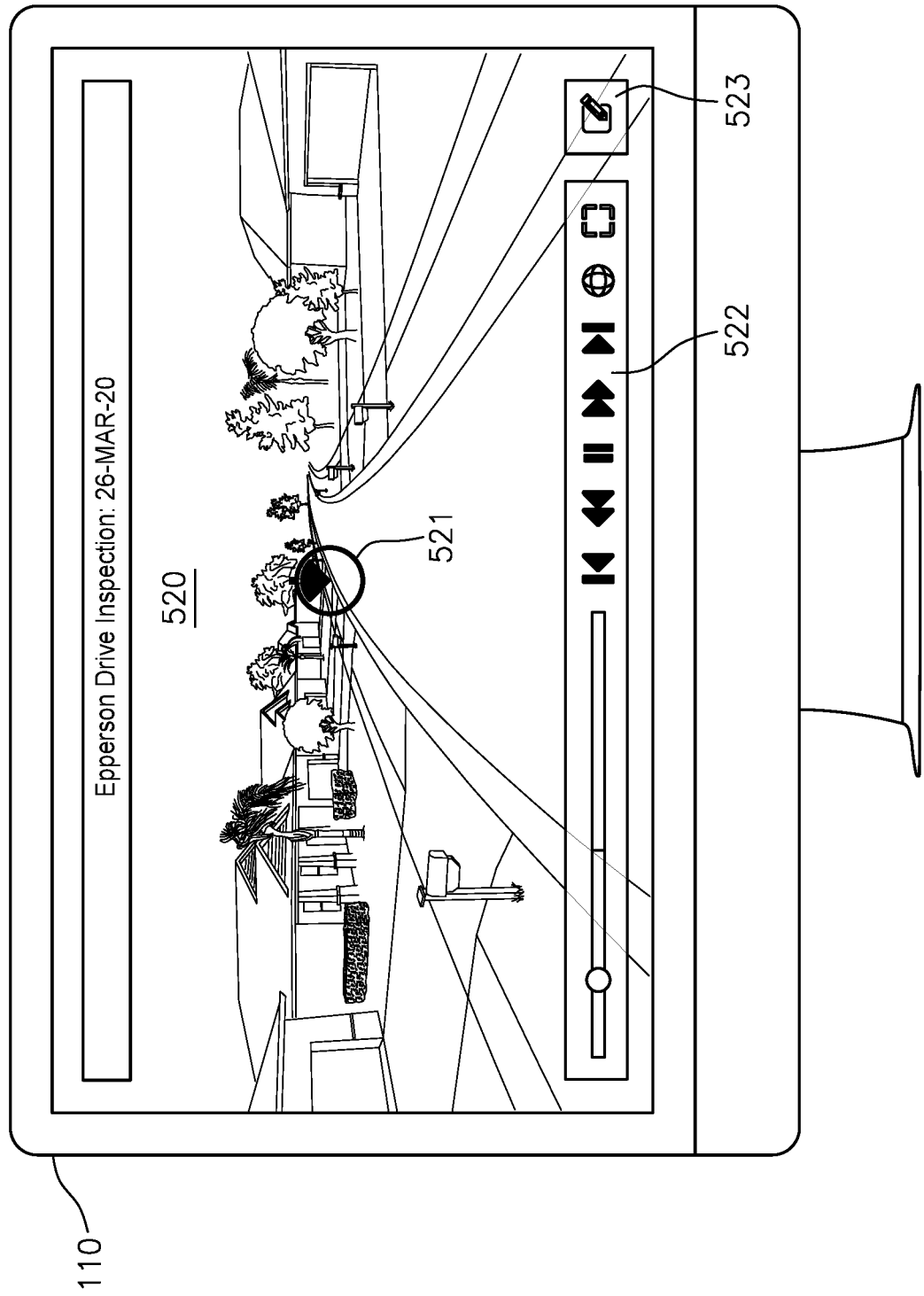
Figure 5D:
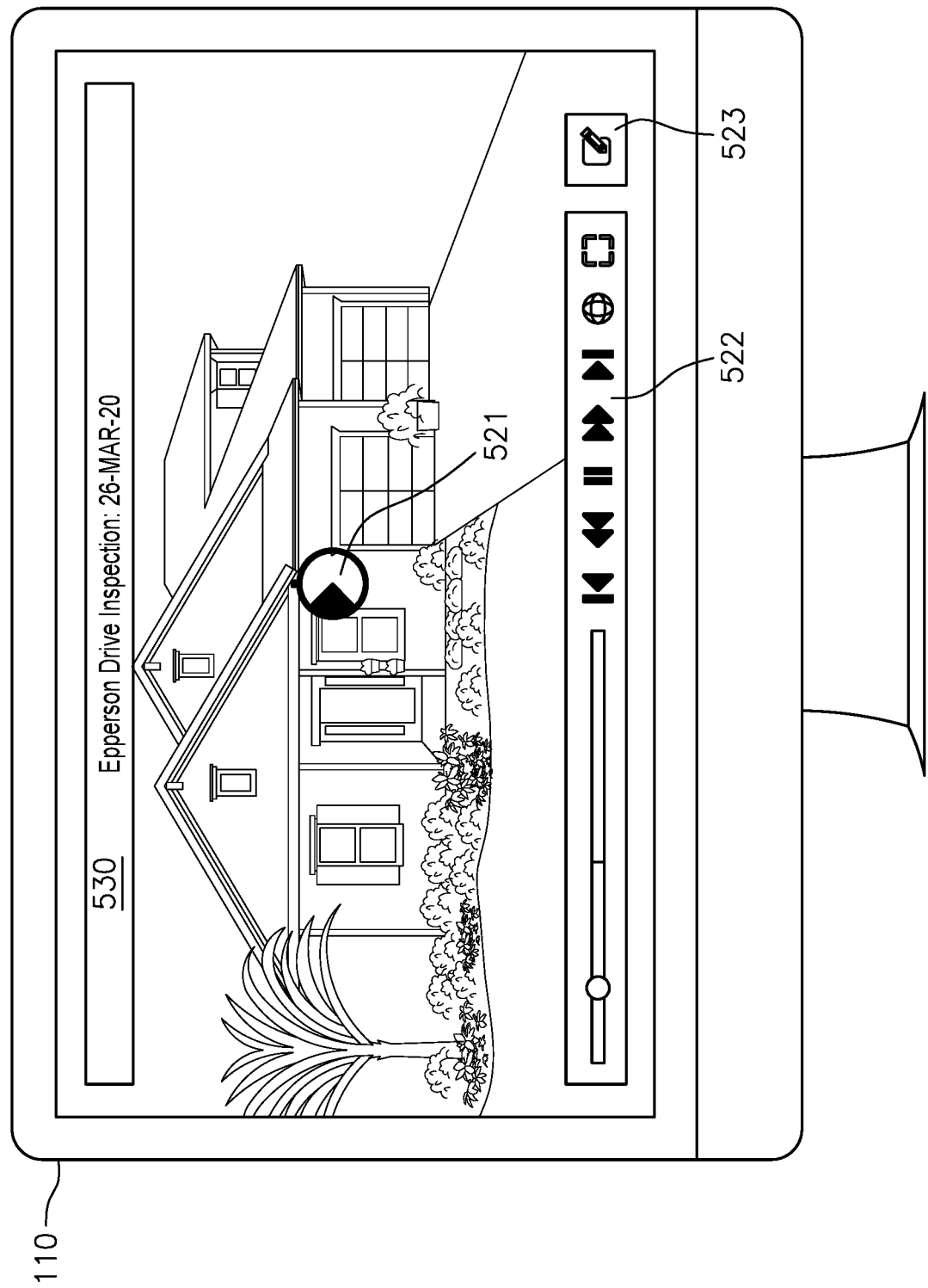

As shown at FIG. 5C, upon selecting a specific community from the list at 511, a virtual drive presentation screen 520 can be displayed. As shown, the screen can provide the audiovisual and location data captured by the platform 20 to the device user. Upon selecting PLAY 521, the display will show what was captured by the platform in real time, thus allowing the user to virtually drive through the selected community. Moreover, the user can be provided with options 522 for manipulating the view, and for augmenting the view 523.

As previously noted, the camera 21 will preferably capture images at 360 degrees. As such, these menu options 522 can include allowing the user to move the displayed view up, down, left and right, zoom, pan, fast forward, reverse, pause, and the like. In this regard, the user can focus the view on each individual home 530 throughout the community to look for violations.

Figure 5E:
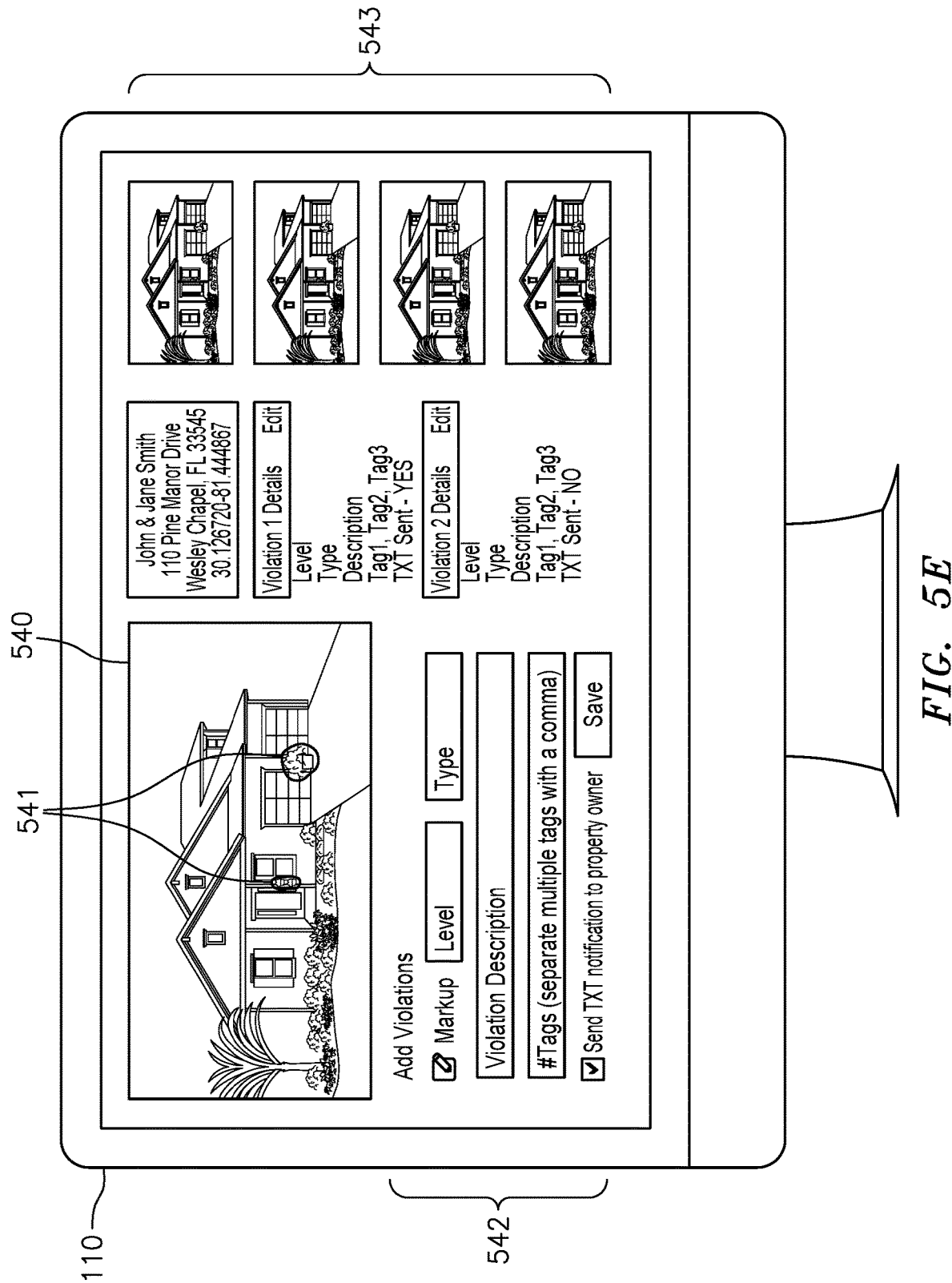

As shown at FIG. 5E, upon determining a violation to the community rules (or other), the user can select the offending property at 540. At this time, the system user can select any of the augmentation tools 523 in order to highlight 541, markup, tag and catalog the noted infractions on the home. The system can also provide a violation notice 542 wherein specifics of the violation can be entered to the system. Additionally, the system can provide the user with a listing of previous violations 543, in order to allow the user to determine if this is a new infraction or if this is a previously noted infraction.

Figure 5F:
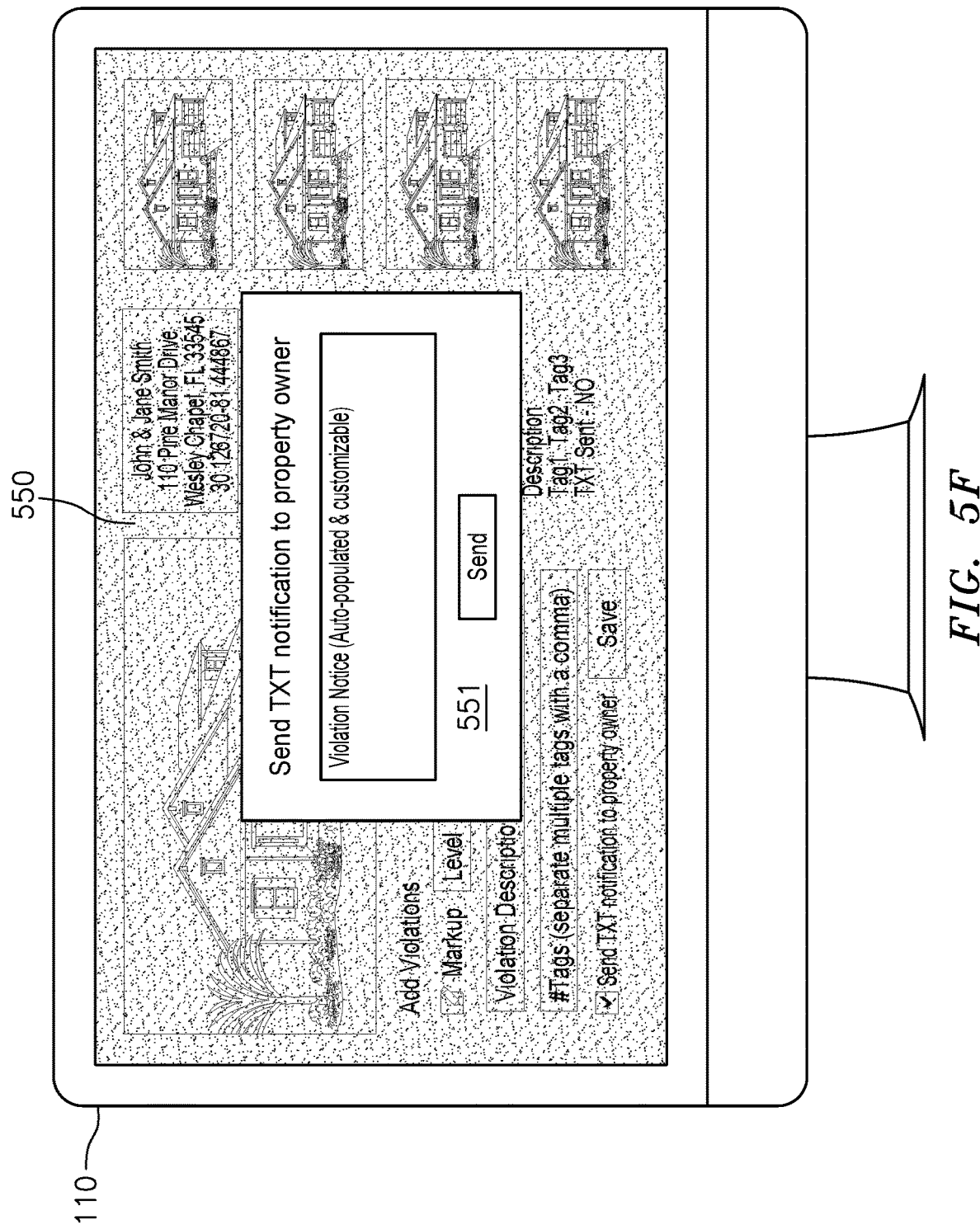

Finally, at FIG. 5F, the system can generate a notification screen 550 wherein the violation can be sent 551 to the property owner. Although illustrated as a TXT notification, this is for illustrative purposes only, as the notification can be sent using any medium such as email or physical mail, for example.

Figure 6C:
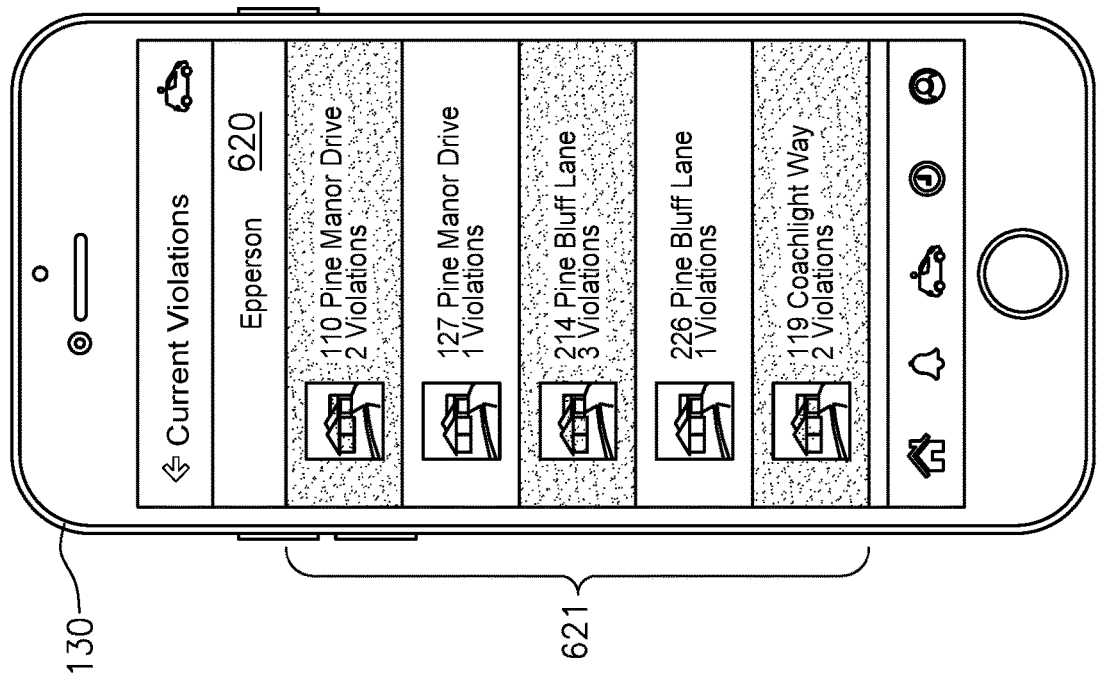

FIGS. 6A-6C illustrate exemplary presentation screens 600, 610, and 620 that can be displayed on the community association interface device 130. After logging in to the system, the user can view a home presentation screen 600 shown at FIG. 6A. Page 600 can function as the home screen for the user and can provide them with a list of selectable menu options such as the ability to view community violations 601, inspection schedules 602, profile 603 and work orders 604, among many others, for example.

As shown at FIG. 6B the violation presentation screen 610 can be generated in response to the user selecting the community violations tab 601. In one embodiment, this screen can allow the user to access the specific violations for properties within the community. For example, the user can see all current violations 611, a listing of all violation letters that have been sent 612, reporting data 613, and violation histories for all of the community properties 614. Of course, other information and menu options can also be provided.

As shown at FIG. 6C the current violation presentation screen 620 can be generated in response to the user selecting the current violations tab 611. In one embodiment, this screen can show a listing 621 of each property including photographs and other such data outlining the violation(s).

Although not specifically illustrated, the system can provide the community association with options for independently generating violation notices and sending the same to the property owner directly or through the management company. Moreover, the community association can arrange for, and schedule items for completion with vendors such as maintenance, lawn and garden, utilities and the like.

Accordingly, the above described system and method provide a novel approach to performing community compliance that eliminates the safety concerns of previous systems and simplifies the process for all parties involved. Although described above with regard to particular method steps and presentation screens containing particular options, this is for illustrative purposes only. To this end, any number of different method steps and/or presentation screens can be provided for performing the functionality described herein.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Likewise, the terms "consisting" shall be used to describe only those components identified. In each instance where a device comprises certain elements, it will inherently consist of each of those identified elements as well.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A community compliance system, comprising:
   a data capture platform having at least one camera, and a driver interface device, said data capture platform being configured to collect community data of a community;
   a community interface device;
   a property management interface; and
   a system administration that is in communication with each of the driver interface device, the community interface device and the property management interface device,
   wherein the property management interface device includes functionality for generating a community report for transmission to the property management interface device based upon the collected community data,
   wherein the property management interface device includes functionality for performing a virtual drive through of the community, and wherein the virtual drive through includes real time viewing of a video and a location address included in the community data.

2. The system of claim 1, wherein the data capture platform further includes a camera mounting device for selectively positioning the at least one camera onto a moving vehicle.

3. The system of claim 2, wherein the at least one camera is configured to selectively capture at least one of still images, video images, or sound.

4. The system of claim 1, wherein the data capture platform further comprises:
   a location identification device that is configured to continually identify a location address of the data platform.

5. The system of claim 4, wherein the community data includes each of a plurality of images captured by the at least one camera, and the location address of the platform at a time each of the images were captured.

6. The system of claim 1, wherein the property management interface device includes functionality for augmenting the video included in the community data.

7. The system of claim 6, wherein said augmenting the video comprises:
   highlighting, marking up, or tagging a still frame portion of the video to demonstrate a community violation.

8. The system of claim 7, wherein the property management interface device includes functionality for generating a violation notice based upon the community data.

9. The system of claim 8, wherein the violation notice includes the augmented video, the location address and a written description of the violation.

10. The system of claim 8, wherein the property management interface device includes functionality for displaying a past violation notice for the location address.

11. The system of claim 10, wherein the property management interface device includes functionality for sending the violation notice to a representative of the location address.

12. The system of claim 1, wherein the property management interface device includes functionality for providing driving instructions to the driver interface device.

13. The system of claim 1, wherein the community report includes a listing of all community violations for the community, and a log showing when the data capture platform visited the community.

14. The system of claim 1, wherein at least one of the property management interface device, the community interface device or the driver interface device includes a mobile application for execution on a smartphone device having a processor, a memory, internet connectivity, and a display screen.

15. A method of performing community compliance, said method comprising:
   providing a data capture platform, a community interface device, a property management interface, and a system administration;
   dispatching the data capture platform to a community location;
   capturing community data of the community location via the data capture platform;
   transmitting the captured community data to the system administrator;
   retrieving, via the property management interface, the captured community data from the system administrator;
   performing a virtual drive through of the community location using the retrieved community data;
   identifying violations of the community location via the property management interface;
   generating a violation notice;
   sending the violation notice to a third party; and
   generating a community report for viewing by the community interface device.

16. The method of claim 15, further comprising:
   augmenting, via the property management interface device, the retrieved community data.

* * * * *